United States Patent [19]

Howell

[11] Patent Number: 5,518,343
[45] Date of Patent: May 21, 1996

[54] DUST-FREE POWDER SUBSTANCE DELIVERY AND FILTER SYSTEM

[75] Inventor: William A. Howell, Slidell, La.

[73] Assignee: Carl A. Dengel, New Orleans, La.; a part interest

[21] Appl. No.: 410,637

[22] Filed: Mar. 24, 1995

Related U.S. Application Data

[63] Continuation of Ser. No. 977,893, Nov. 18, 1992, abandoned.

[51] Int. Cl.⁶ .................................................. B65G 53/12
[52] U.S. Cl. .......................... 406/38; 406/146; 406/172; 406/173; 406/175
[58] Field of Search ................................. 406/171, 172, 406/173, 175, 168, 146, 38, 40, 41, 42; 55/432, 433; 95/269

[56] References Cited

U.S. PATENT DOCUMENTS

| | | | |
|---|---|---|---|
| 1,464,113 | 8/1923 | Ryding | 55/432 |
| 2,353,828 | 7/1944 | Hyde | 55/433 |
| 2,890,081 | 6/1959 | Terrett | 55/432 |
| 3,393,943 | 7/1968 | Kelly . | |
| 3,424,501 | 1/1969 | Young . | |
| 3,429,108 | 2/1969 | Larson | 55/432 |
| 3,874,857 | 4/1975 | Hunt et al. . | |
| 4,017,281 | 4/1977 | Johnstone . | |
| 4,089,664 | 5/1978 | Noland . | |
| 4,159,151 | 6/1979 | Wood | 406/173 X |
| 4,298,360 | 11/1981 | Poll . | |
| 4,336,041 | 6/1982 | Jolin . | |
| 4,431,535 | 2/1984 | Spruiell | 55/432 |
| 4,695,205 | 9/1987 | Levine . | |
| 4,844,665 | 7/1989 | Howell | 406/172 X |
| 4,846,608 | 7/1989 | Sanders | 406/173 X |
| 4,988,240 | 1/1991 | Thompson | 406/173 X |
| 5,163,786 | 11/1992 | Christianson | 406/41 |
| 5,215,553 | 6/1993 | Herman et al. | 95/269 |

FOREIGN PATENT DOCUMENTS

| | | | |
|---|---|---|---|
| 1126799 | 3/1962 | Germany | 406/173 |
| 2439716A1 | 8/1974 | Germany . | |
| 152719 | 9/1983 | Japan | 406/173 |
| 57-34879 | 10/1983 | Japan . | |
| 1676966 | 9/1991 | U.S.S.R. | 406/173 |

*Primary Examiner*—Gary C. Hoge
*Attorney, Agent, or Firm*—Howell & Haferkamp

[57] ABSTRACT

A substance delivery and filter system for use in delivering or conveying a dry, fluid powder substance from a closed container to an open receptacle is provided. The delivery and filter system includes a filter housing having a heavy particle cyclone separator, a fine particle filter bag assembly, a substance inlet port positioned just above the heavy particle cyclone separator, a substance outlet port positioned at the bottom of the cyclone separator, and a filtered air outlet port communicating between the clean side of the filter bag assembly and the outside environment. The powder substance in the container is entrained in an air stream and introduced into the filter housing through a conduit connected to the substance inlet port. The heavier substance particles fall downwardly from the swirling air stream caused by the cyclone separator and are discharged into an open-air receptacle from the substance outlet port. The air and particulate matter are forced upwardly to the filter bag assembly where the fine particles are trapped on the outside of the filter bags. Filtered air is exhausted from the filter housing through the filtered air outlet ports. The filter bags are cleaned by bursts of air introduced into the filter housing through the filtered air outlet port to purge the filter bags of any substance collected thereon.

11 Claims, 3 Drawing Sheets

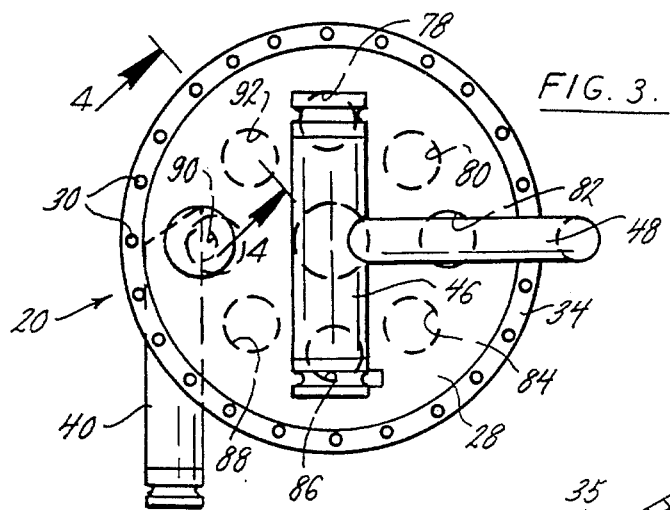
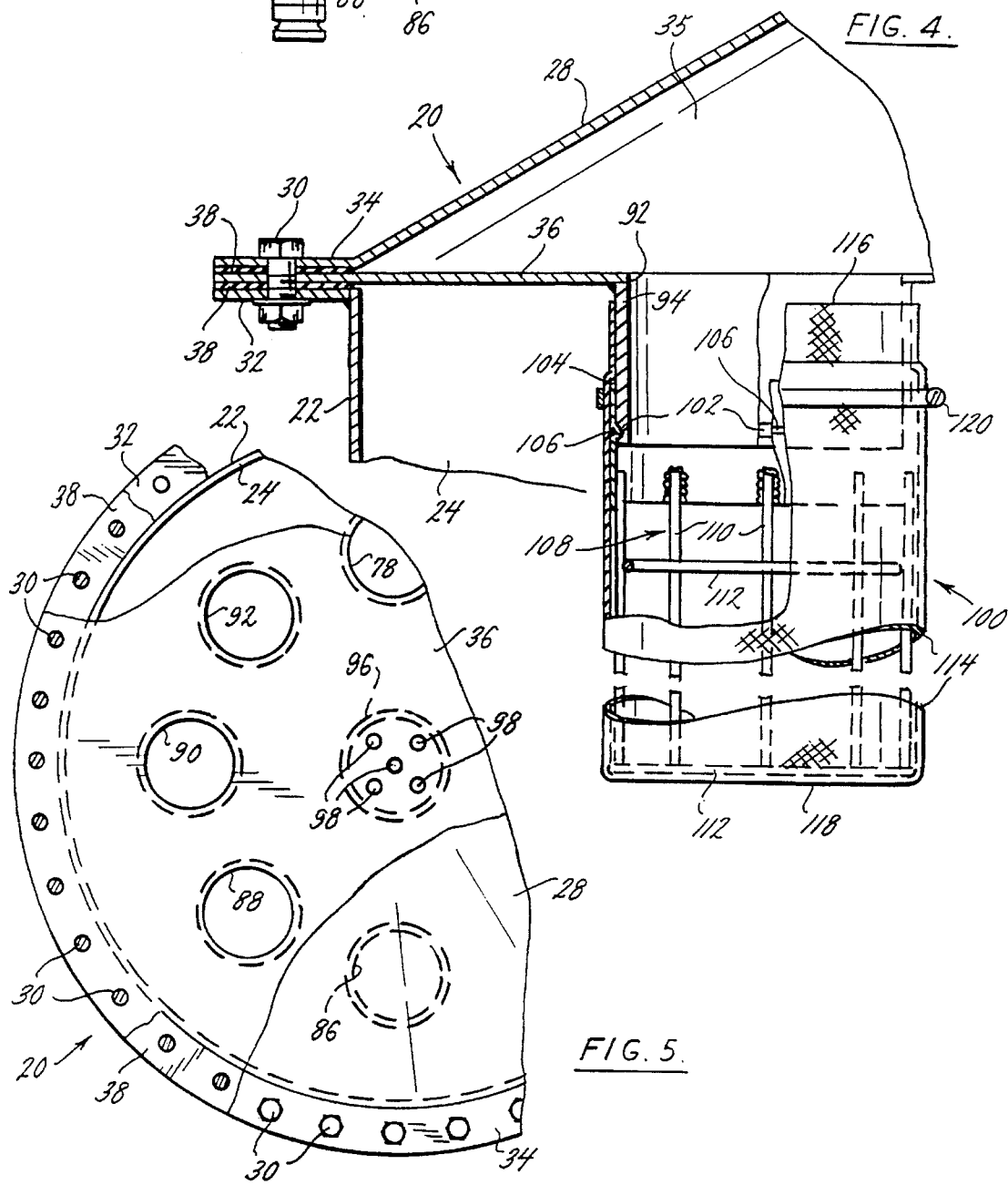

DUST-FREE POWDER SUBSTANCE DELIVERY AND FILTER SYSTEM

This is a continuation of application Ser. No. 07/977,893 filed on Nov. 18, 1992, now abandoned.

BACKGROUND OF THE INVENTION

1. Field of the Invention

This invention relates, in general, to industrial filter systems and, more particularly, to an industrial filter system and substance delivery method that is adapted for use in delivering a fine, dry powder such as cement, barite, hematite, fly ash or the like into an open pit or vessel in a manner substantially reducing the amount of dust normally created by such operations.

2. Description of the Related Art

Various industrial applications require the introduction or transportation of a fine dry powder such as cement, barite, hematite, fly ash, kiln dust or the like into an open pit or receptacle. For example, in the oil industry, sludge pits created in oil fields must be "cleaned-up" or remediated. This is usually accomplished by dewatering the sludge pit and then adding a solid powder material such as fly ash to the sludge pit to solidify the sludge for removal or further treatment. Conventionally, the powder material is pneumatically conveyed from a pressurized storage tank or closed tank truck directly into the sludge pit. The pneumatic tank truck is typically equipped with a blower which creates a higher than atmospheric pressure inside the delivery tank which causes the powder substance to flow from the tank to the desired area in a stream of air. The powder substance is entrained in the air stream. As the substance is conveyed to the open pit with such a stream of air, the substance is released into the pit with such air causing a substantial amount of dust and particulate matter to be released into the atmosphere thereby polluting the surrounding environment. As is understood, such a process creates an unsafe and unhealthy work environment for those involved in the process. Similar problems are created whenever a powder substance is transferred in a stream of air to an open receptacle or vessel in other industrial applications.

Various filter systems are known to filter powder substances. One of the most common devices incorporates a fan dust collector. Such a collector is very expensive, both to build and to maintain, and is typically stationary so it can be used only at a particular location. Thus, the use of such device is particularly disadvantageous, and inapplicable, to situations involving transporting or delivering powder substances to open pits at remote locations.

Portable industrial filters are also known in the art such as that disclosed in U.S. Pat. No. 4,844,665 issued to Howell on Jul. 4, 1989. The Howell patent discloses a filter system for use in filtering a vented air stream from a closed container after the air stream has delivered a substance to such closed container where the vented air stream may carry over some dust or particulate matter. Howell does not disclose a method of transferring a powder substance directly to an open receptacle in a manner substantially reducing the amount of dust created in the surrounding atmosphere.

Thus, a need exists for a portable filter system that is adapted for use in transporting or delivering a powder substance to an open air receptacle in a manner significantly reducing the amount of particulate pollution or dust typically accompanying such an operation.

SUMMARY OF THE INVENTION

The present invention is directed to a filter system adapted to be positioned to receive a powder substance directly from a closed powder substance container and to deliver the powder substance directly to an open-air receptacle which is to receive the powder substance. The filter system contains a filter housing having a heavy particle cyclone separator and a fine filter bag assembly. The filter housing also includes a substance inlet port positioned just above the heavy particle cyclone separator and just below the fine filter air bag assembly, a substance outlet port positioned at the bottom of the cyclone separator and a filtered air outlet port communicating with the clean air side of the filter bag assembly and the outside environment.

The air stream containing the powder substance is introduced under pressure, through a conventional hose directly and tangentially into the filter housing. The powder substance particles are slung to the outer wall of the filter body at the top of the cyclone separator and then fall downwardly from the swirling air stream into the lower part of the cyclone separator and out the substance outlet port for delivery direct to the open receptacle. The air and fine powder particles that otherwise could pollute the surrounding environment are forced upwardly to the filter bag assembly where the fine powder is trapped by the filter bag assembly which comprises a plurality of coated filter socks on wire frames suspended from a filter bag support plate. Air is able to pass through the filter socks and into the clean air plenum of the filter housing and the filtered air is exhausted out the filtered air outlet port into the surrounding environment. After the desired amount of powder substance has been delivered to the open receptacle, or when the outer surface of the filter bags become loaded with fine dust particles such that the flow of air out of the filtered air outlet port is restricted, the filter system can be purged of the powder substance collected on the outside of the filter socks by introducing blasts of air through the filtered air outlet port which causes the substance collected on the filter socks to be discharged and fall into the heavy particle cyclone separator and out the substance outlet port and into the receptacle. During such operation, the substance inlet port is capped so that substance does not escape therethrough.

The filter system is portable and can be suspended from a crane or the like or from a vehicle such as a backhoe and, as the vehicle is driven, moved along in a swinging motion while product is being discharged so as to provide an even distribution of a desired substance in the open receptacle. The filter can be transferred between locations on a pick-up truck, and it can be handled either by a fork lift at the site or by a small crane or backhoe.

A primary aspect of the present invention is the provision of a method of transferring a powder substance from a pressurized container to an open receptacle by providing a filter means having a substance inlet port, a substance outlet port and a filtered air outlet port between the container and the open receptacle, connecting a conduit between the container and the substance inlet port of the filter means and blowing the substance in a stream of air through the conduit and into the filter means and thereby separating the substance from the air so that the substance is discharged into the receptacle through the substance outlet port without creating an undesirable amount of dust expelled into the surrounding atmosphere and filtered conveyance air is discharged into the surrounding environment through the filtered air outlet port after passing through a filter bag assembly.

Among the many advantages of the present invention may be noted the provision of a substance delivery system useful in the conveyance of a powder substance entrained in a stream of air to an open receptacle wherein the substance and air are separated in a manner that reduces the amount of particulate pollution normally created by such conveyance; the provision of such a substance delivery system that is portable and has no moving parts or electrical power source integral therewith; the provision of such a system that can convey a powder substance into an open receptacle in a manner creating a safer and healthier work environment for those involved in the operation of such system; the provision of a method for transferring a powder substance that is readily adaptable to numerous operations involving the delivery or conveyance of a powder substance into an open receptacle or environment; and the provision of such a method that results in little or no loss of substance.

BRIEF DESCRIPTION OF THE DRAWINGS

FIG. 3 is a top plan view of the filter assembly of the present invention;

FIG. 4 is a view in section on an enlarged scale taken along the plane of the line 4—4 of FIG. 3;

FIG. 5 is a fragmentary top view of the present invention with portions broken away;

DETAILED DESCRIPTION OF PREFERRED EMBODIMENTS

Figures 1, 2:
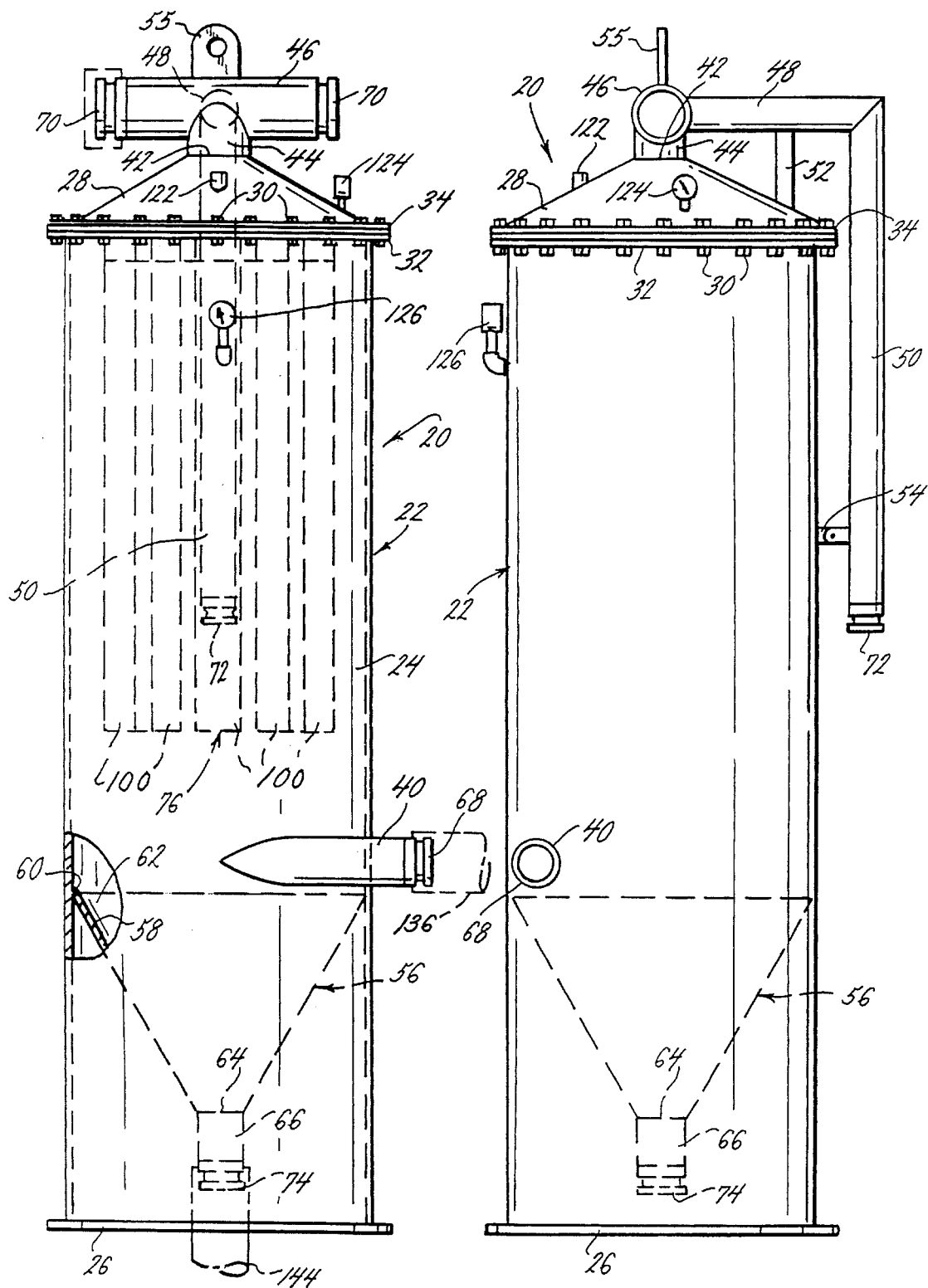
FIG. 1 is a front elevation view of the filter assembly of the present invention.
FIG. 2 is a side elevation of the filter assembly as viewed from the right side of FIG. 1.

As shown in FIG. 1, the filter assembly 20 has a housing 22 comprising a vertical cylindrical sidewall 24, a bottom flange 26 and an inverted conical top 28. The bottom flange 26 and the top flange 32 is joined to the cylindrical sidewall 24 by welding, whereas the top 28 is connected by a plurality of bolts 30 extending through holes provided in the flanges 32 and 34, such flanges being welded to the cylindrical sidewall 24 and the cover 28, respectively. As illustrated in FIG. 4, the bolts 30 also connect a filter support plate 36 between the flanges 32 and 34, with seals provided by the neoprene gaskets 38. The purpose of the filter support plate 36 will be described hereinafter. For now, suffice it to say that the bolts 30 allow the cover 28 to be removed, providing access to the filter support plate 36 which likewise can be removed to provide access to other areas within the housing 22.

Although the housing 22 can be of various sizes, the filter assembly 20 is particularly adapted for industrial applications of the kind that will be described, and for such purposes, it is preferably about 8 feet tall and about 30 inches in diameter. At a location about 3 feet above the bottom flange 26, there is a substance inlet tube 40 that extends through the cylindrical sidewall 24 horizontally and tangentially. At the top of the housing 22, a vent port 42 opens through the center of the inverted conical cover 28. A vertical tube 44 leads from the vent port 42 and connects with a horizontal tube or pipe 46. The vertical tube 44 is formed in a "saddle" shape and is welded to horizontal pipe 46. The horizontal pipe 46 and the vertical tube 44 preferably have a 6 inch diameter and form a communicating conduit between the clean air plenum 35 in the upper conical housing 28 and the surrounding atmosphere. In addition, a tube 48 is connected to one side of horizontal pipe 46 and has a section 50 that extends vertically down so that the tube opening faces downward as shown in FIGS. 1 and 2. The open ends of the pipe 46 and the tube 48 permit the exhausting of clean air from the filter housing 22 to the surrounding atmosphere as will be described herein. In the normal substance delivery mode, both ends of the pipe 46 and the end of tube 48 are open. Tube 48 may be held in place by supports 52 and 54 as shown in FIG. 2 as well as being welded to pipe 46.

A lifting lug 55 is welded onto the top of the horizontal pipe 46 to facilitate lifting and moving of the filter housing 22 as will be described herein.

Within the housing 22 and immediately below the inlet tube 40, there is a cyclone separator 56. The cyclone separator 56 is in the form of a conical member 58 having its upper perimeter 60 welded to the inner sidewall of the housing 22, as shown in FIG. 1, to provide a large upper opening 62 for receiving product or substance along with its conveyance air. The conical member 58 tapers downwardly to a smaller lower opening 64. The lower opening 64 is connected to an outlet tube 66 which extends below the lower opening 64, but remains above bottom flange 26. Thus, the housing 22 can be placed on a flat surface without resting on the outlet tube 66. In accordance with the method of the present invention, substance entrained in a stream of air is introduced into housing 22 through substance inlet tube 40 just above the cyclone separator 58 and tangential to it.

The inlet tube 40, the horizontal tube 46, the tube 48 and the outlet tube 66 are each provided with conventional quick connect fittings 68, 70, 72 and 74, respectively, that allow a cap or hose similarly equipped to be quickly connected or disconnected to them. FIG. 1 illustrates various hoses in dotted lines connected to the inlet tube 40 and the outlet tube 66 as well as a closure cap on one end of horizontal tube 46. It will be understood that, as will be described, in the transference of a powder substance through the filter housing 22, both ends of the horizontal tube 46 and the opening in tube 48 are normally open as is substance outlet tube 66. Substance inlet port 40 is also normally open, but connected to a source of substance by a hose or other suitable conduit.

The filter support plate 36 supports a fine filter assembly 76 and serves to divide the clean air section from the dirty air section. In that connection, the filter support plate 36 has eight holes 78, 80, 82, 84, 86, 88, 90 and 92 through it. As particularly shown in FIG. 3, each of the holes 78–92 is centered on a circle. Protruding through each hole 78–92 is a short downwardly-extending cylindrical sleeve 94 that is tack welded to the filter support plate 36 as is best shown in FIG. 4. A similar short downwardly-extending sleeve 96 is also welded to the filter support plate 36 at its center. There are a plurality of small holes 98 through the plate 36 and within the area of the sleeve 96 as shown in FIG. 5.

Each short sleeve 94 and 96 supports a fine filter bag assembly 100. Each sleeve 94 and 96 has an annular groove 102 to facilitate mounting its respective bag assembly 100. The bag assembly 100 includes a sleeve 104 having an annular detent 106 that snaps within the annular groove 102. A wire frame 108 includes a plurality of vertical wires 110 welded to the sleeve 106 and a plurality of horizontal wire rings 112 welded to the vertical wires 110 to shape the wire frame 108 in the general cylindrical orientation indicated in FIG. 4.

A filter sock 114 made of a filtering medium, preferably coated fabric, is fitted over the wire frame 108 and about the sleeve 106. The filter sock 114 has an open upper end 116 and a closed lower end 118 so that air flowing through the sleeves 94 and 96 and through the holes 78–92, as well as the holes 98, must first flow through the filter assemblies 100. A removable clamp 120 of conventional design is used to lock each filter assembly 100 in place.

For a housing 22 that is about 8 feet tall and about 30 inches in diameter, each filter bag assembly 100 is preferably about 48 inches tall and about 4½ inches in diameter. While the holes 78–92 are about 4¼ inches in diameter, the five center holes 98 are about ½ inch in diameter each. This reduced area of opening within the center sleeve 96 prevents the air flow from being concentrated at the center filter assembly bag as would otherwise result because of the central location of the upper vent port 42.

The housing includes a pressure relief valve 122 through the cover 28 which regulates the pressure inside the filter body 22. Also, there are pressure gauges 124 and 126. The pressure gauge 124 extends through the cover 28 to measure air pressure upstream of the fine filter assembly 76 during the purge mode, whereas the pressure gauge 126 extends through the sidewall 24 to measure the resistance of air flow through the fine filter assembly 76 during the delivery mode. When the pressure difference between the areas measured by gauges 124 and 126 reaches a predetermined value, the operator will know that the fine filters of assembly 76 have become coated and needs to be purged in a manner to be described.

Figure 6:
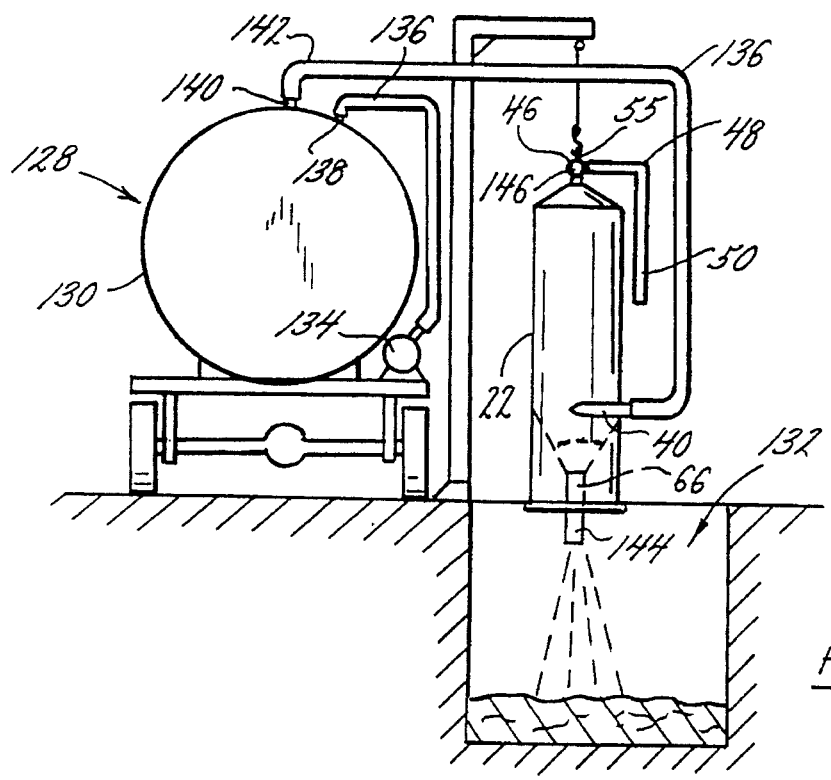
FIG. 6 is a schematic view showing the filter assembly installed between a delivery truck and an open pit in a substance delivery mode.

FIG. 6 is illustrative of a typical installation in use of the filter assembly 20 in a substance delivery mode. In this example, a tanker truck 128 has a supply of solid fluid powder substance, such as barite, hematite, cement, sand, fly ash, kiln dust or the like in its tank. An open pit or receptacle 132 at a delivery site is to receive the substance transferred from the tank 130. The truck 128 carries a power-driven blower 134 that can be connected by a hose 136 to a port 138 in the tank 130.

Another port 140 in the tank 130 is connectable by a hose 142 to the substance inlet port 40. A hose 144 is connected to substance outlet port 66 to direct the flow of substance through the filter assembly 20 into the open pit 132. Conventionally, the hose 142 would directly deliver the substance from the tank 130 to the open pit 132 with dispersion of fine powder dust to the surrounding atmosphere caused by the conveyance air used to convey the product to the pit 132. However, using the filter assembly 20 and, with the blower 134 operating, air is forced into the tank 130. The air entrains the solid substance therein and creates a stream of air with substance entrained therein that flows through the hose 142 through the inlet port 40 into the filter assembly 22. The substance and conveyance air is introduced above the cyclone separator 56 and tangentially thereto in a manner causing the substance and air to swirl within the cylindrical housing 22. The conveyance air begins to rise within the housing whereas the heavier substance particles fall from the swirling air stream into the conical member 58 of the cyclone separator 56. As such, the conveyance air is separated from the substance within the filter housing 22. The conveyance air is forced upward to the filter assembly 76 as a result of the horizontal pipe 46 and the tube 48 being open at their ends to the outside atmosphere and the greater pressure of the air being blown into the housing 22 from the tank 130. This being the path of least resistance for the air separated from the substance. The air stream contains fine particles of the substance being introduced into the housing assembly 22 and will circulate among the fine filter bag assemblies 100. These fine filter bag assemblies separate the finer substance particles from the air stream and permit clean filtered air to flow through the filter sock 114 and upward through the holes 78–92 and 98 into the clean air plenum 35. The air in the clean air plenum 35 is then vented to the outside atmosphere through the open ends of horizontal pipe 46 and the tube 48.

As air seeks the path of least resistance, it will tend to flow through surface areas of the filter bag assemblies 100 that are the least coated with substance. The smaller holes 98, relative to the holes 78–92, contribute to the uniform distribution of air flow among the filter bag assemblies 100.

When beginning the delivery mode, it is necessary to create a bed of substance in the lower part of the cyclone separator 56 before permitting the substance to flow into the open pit 132. Otherwise, the air stream containing substance will blow into the pit 132. By creating a bed of substance in the cyclone separator, the path of least resistance for the air stream is directed upwardly in the filter housing and out the top of the filter. In order to create this bed of substance, the hose 144 can be submerged in the pit 132 to prevent delivery of the substance or by any other means for shutting off delivery of the substance into the pit. This permits the substance to accumulate in the cyclone separator and restricts air flow out of the substance outlet port. After a sufficient bed of substance is created in the filter housing, the hose and filter system can be positioned to deliver substance into the open pit.

Figure 7:
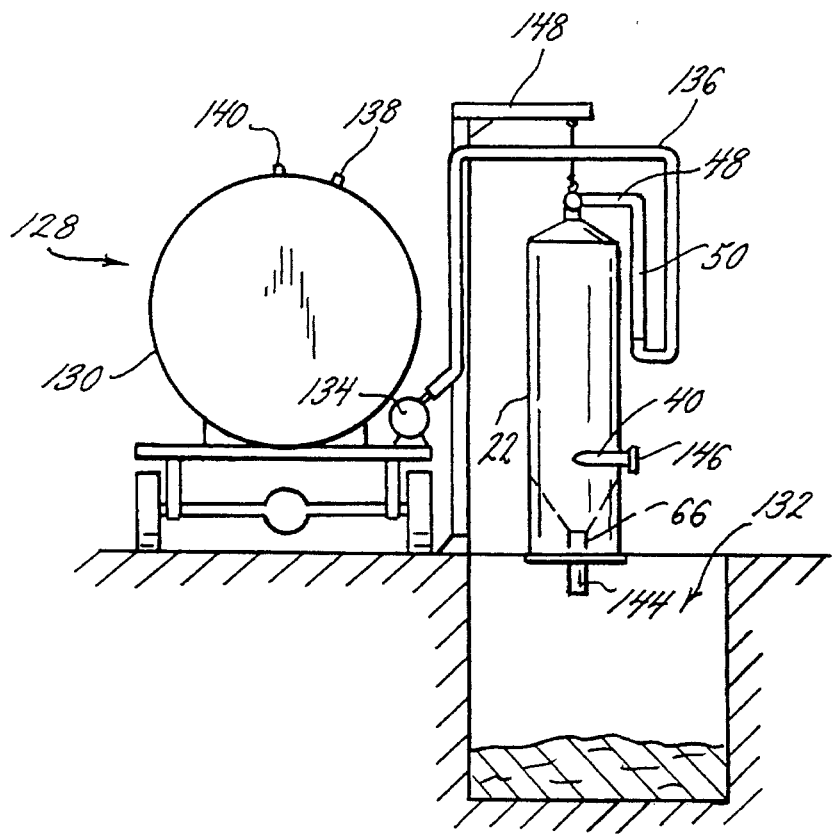
FIG. 7 is a schematic diagram showing the filter assembly installed in a filter cleaning or purging mode.

After the desired amount of substance has been introduced into the open pit 132, or during transferring when the pressure gauge 126 indicates that a predetermined resistance exists, such as 5 psi, in the dirty air side of the filter housing 22, the filter assembly 20 can be purged. FIG. 7 illustrates a typical purging operation. For this, a cap 146 is placed on the inlet port 40 and at both ends of the horizontal pipe 46 and the hose 136 is connected to the opening in section 50 of the tube 48. When the blower 134 is operated, it blows air through the filter assembly 20 in a purging direction opposite to the previously described substance delivery direction.

The blower 134 is operated in short bursts, producing air pulses that dislodge the substance from the surface of the fine filter assemblies 100 that had collected there during the substance delivery mode. This dislodged substance flows with the air stream bursts downwardly into the cyclone separator cone 58 and is discharged through the substance outlet tube 66. The continued bursts of air carry the substance into the open pit 132. Because the blower 134 is operated in bursts, and because the amount of substance collected on the filter socks is not considerable during this purging mode, substantially dust free substance is discharged through outlet tube 66 and hose 44 into the open pit 132.

As shown in FIGS. 6 and 7, the filter assembly 20 may be held by a conventional crane, backhoe or other holding means above the receptacle receiving the substance. As shown in FIGS. 6 and 7, a stand 148 is shown holding the filter assembly 20 by the lifting lug 55 above the open pit 132. If desired, the filter assembly 20 may be moved along the length or width of the pit 132, by such means as a backhoe, to provide an even distribution of the substance into the pit 132. Furthermore, upon completion of the transfer of substance and of the purging of the filter assembly 20, the filter assembly 20 can be loaded on a truck and transported for use at a different location. Thus, the filter assembly 20 is completely portable. The filter assembly 20 has no moving parts and is long lasting, with only the filter bag assemblies 100 needing occasional replacement. Of course, different types of filters can be used for different products. The filter assembly 20 can be used for a long period of time at many different sites where powder substances are being introduced into a receptacle open to the atmosphere.

Although not shown, the filter assembly 20 of the present invention may be adapted with a spreader bar connected to the substance outlet port 66 via a conduit to facilitate the spreading of a powder substance onto a roadway, open pit or like area.

There are various changes and modifications which may be made to the invention as would be apparent to those skilled in the art. These changes or modifications, however, are included in the teaching of the disclosure, and it is intended that the invention be limited only by the scope of the claims appended hereto.

What is claimed is:

1. A method of transferring a powder substance from a closed container to an open receptacle wherein a power source is associated with the container for pressurizing the container and thereby blowing air with the powder substance entrained therein to the open receptacle, the method comprising the steps of:

positioning a filter housing having a hollow interior volume, a powder substance inlet, a powder substance outlet, and a filtered air outlet between the container and the open receptacle;

connecting a conduit between the container and the powder substance inlet of the filter housing;

operating the power source for blowing air into the container for entraining powder substance therein and conveying the powder substance in a stream of air through the conduit into the filter housing through the powder substance inlet;

spinning the air and the entrained powder substance in the filter housing interior and thereby separating the powder substance from the air;

causing the air in the filter housing interior to exit the interior only through the filtered air outlet by temporarily closing the powder substance outlet; creating a plug of powder substance in the housing interior covering over the powder substance outlet by continuing to convey the powder substance in the stream of air into the filter housing through the powder substance inlet;

opening the powder substance outlet; and maintaining the plug of powder substance in the housing over the powder substance outlet while the powder substance outlet remains open so that only powdered substance is discharged from the interior through the powder substance outlet to the open receptacle and filtered conveyance air is discharged from the interior through the filtered air outlet.

2. The method of claim 1, further comprising the step of:

discharging powder substance from the plug of powder substance through the powder substance outlet while continuing to convey the powder substance in the stream of air into the filter housing through the powder substance inlet thereby maintaining the plug of powder substance in the filter housing.

3. The method of claim 2, further comprising the step of:

discharging powder substance from the plug of powder substance solely by gravitation of the powder substance through the powder substance outlet.

4. The method of claim 1, further comprising the steps of:

filtering dust of the powder substance from the air exiting the housing interior through the filtered air outlet by first passing the air in a first direction through at least one filter in the housing interior, thereby entrapping the dust on the at least one filter;

connecting a conduit between the power source and the filtered air outlet and operating the power source for blowing air into the housing interior through the filtered air outlet and through the at least one filter in a second direction, opposite the first direction, and thereby releasing the dust entrapped on the at least one filter and discharging the dust from the housing through the powder substance outlet.

5. The method of claim 4, further comprising the step of:

closing the powder substance inlet prior to blowing air into the housing through the filtered air outlet.

6. A method of separating a powder substance entrained in a flow of conveyance air from the flow of conveyance air, the method comprising:

directing the flow of conveyance air with the entrained powder substance into a powder substance inlet of a filter housing, the filter housing also having a powder substance outlet and an air outlet;

separating the powder substance from the air in the filter housing by causing the powder substance to gravitate down in the filter housing and the air to rise up in the filter housing;

causing the air to exit the filter housing only through the air outlet by temporarily closing the powder substance outlet and thereby creating a plug of the powder substance in the filter housing covering over the powder substance outlet by continuing to direct the flow of conveyance air with the entrained powder substance into the powder substance inlet of the filter housing while causing the air to exit the filter housing only through the air outlet;

then opening the powder substance outlet after the temporary closing of the powder substance outlet and the creating of the plug of powder substance in the filter housing over the powder substance outlet;

discharging powder substance from the plug of powder substance through the opened powder substance outlet; and maintaining the plug of powder substance in the filter housing by continuing to direct the flow of conveyance air with the entrained powder substance into the powder substance inlet of the filter housing.

7. The method of claim 6, further comprising the step of:

discharging only powder substance from the plug of powder substance through the opened powder substance outlet.

8. The method of claim 6, further comprising the step of:

discharging powder substance from the plug of powder substance solely by gravitation of the powder substance through the opened powder substance outlet.

9. The method of claim 6, further comprising the step of:

filtering dust of the powder substance from the air exiting the filter housing through the air outlet by first passing the air in a first direction through at least one filter in the filter housing, thereby entrapping the dust on the at least one filter, prior to the air exiting the filter housing through the air outlet.

10. The method of claim 9, further comprising the steps of:

directing a flow of air into the filter housing through the air outlet and through the at least one filter in a second direction, opposite the first direction, and thereby releasing the dust entrapped on the at least one filter and discharging the dust from the filter housing through the powder substance outlet.

11. The method of claim 10, further comprising the step of:

closing the powder substance inlet prior to directing the flow of air into the filter housing through the air outlet.

* * * * *